(12) United States Patent
Schramm et al.

(10) Patent No.: US 7,413,049 B2
(45) Date of Patent: Aug. 19, 2008

(54) PEDESTRIAN PROTECTION HOOD LIFTING SYSTEMS

(75) Inventors: Michael R. Schramm, Perry, UT (US); Brent Parks, Englewood, CO (US); David J. Green, Brigham City, UT (US)

(73) Assignee: Antolin ASP, Inc., Ogden, UT (US)

( * ) Notice: Subject to any disclaimer, the term of this patent is extended or adjusted under 35 U.S.C. 154(b) by 0 days.

(21) Appl. No.: 11/582,655

(22) Filed: Oct. 18, 2006

(65) Prior Publication Data

US 2008/0093150 A1    Apr. 24, 2008

(51) Int. Cl.
*B60K 28/10*    (2006.01)

(52) U.S. Cl. ...................................................... 180/274

(58) Field of Classification Search ................. 180/274, 180/271, 282, 281, 69.21; 296/187.03, 187.04, 296/193.11; 280/730.1
See application file for complete search history.

(56) References Cited

U.S. PATENT DOCUMENTS

| | | | |
|---|---|---|---|
| 4,249,632 A | 2/1981 | Luchini et al. .............. 180/274 |
| 6,182,782 B1 * | 2/2001 | Matsuura et al. ............ 180/274 |
| 6,237,992 B1 | 5/2001 | Howard ....................... 296/194 |
| 6,293,362 B1 | 9/2001 | Sasaki et al. ................ 180/274 |
| 6,364,402 B1 * | 4/2002 | Sasaki .................... 296/187.09 |
| 6,439,330 B1 | 8/2002 | Paye ....................... 180/69.21 |
| 6,497,302 B2 * | 12/2002 | Ryan .......................... 180/274 |
| 6,499,555 B2 | 12/2002 | Ishizaki et al. .............. 180/274 |
| 6,513,617 B2 | 2/2003 | Sasaki et al. ................ 180/274 |
| 6,516,278 B1 | 2/2003 | Ishizaki et al. ................ 702/33 |
| 6,533,058 B2 | 3/2003 | Peter .......................... 180/274 |
| 6,571,901 B2 * | 6/2003 | Lee ............................ 180/274 |
| 6,588,526 B1 | 7/2003 | Polz et al. ................. 180/69.21 |
| 6,712,169 B2 | 3/2004 | Ryan et al. .................. 180/274 |
| 2002/0011372 A1 | 1/2002 | Sasaki et al. ................ 180/274 |
| 2002/0026685 A1 | 3/2002 | Bjureblad et al. ............. 16/221 |
| 2002/0033294 A1 | 3/2002 | Ishizaki et al. .............. 180/274 |
| 2002/0043417 A1 | 4/2002 | Ishizaki et al. .............. 180/274 |
| 2006/0175115 A1 * | 8/2006 | Howard ....................... 180/274 |

* cited by examiner

*Primary Examiner*—Faye M. Fleming
(74) *Attorney, Agent, or Firm*—Sally J Brown; Stoel Rives LLP

(57) ABSTRACT

Automotive pedestrian protection hood lifting systems are adaptive, resettable, and redeployable. The hood may be moved between a retracted position and an extended position. A spring may be biased to selectively vary a load placed upon the hood based on predetermined event signals.

34 Claims, 6 Drawing Sheets

PEDESTRIAN PROTECTION HOOD LIFTING SYSTEMS

TECHNICAL FIELD

The present invention relates generally to the field of automotive protective systems. More specifically, the present invention relates to systems for protection of a pedestrian when accidentally struck by an automobile.

BRIEF DESCRIPTION OF THE DRAWINGS

Understanding that the drawings depict only typical embodiments of the disclosure and are not therefore to be considered limiting, the disclosure will be described and explained with additional specificity and detail through the use of the below-referenced accompanying drawings.

DETAILED DESCRIPTION

Figure 1A:
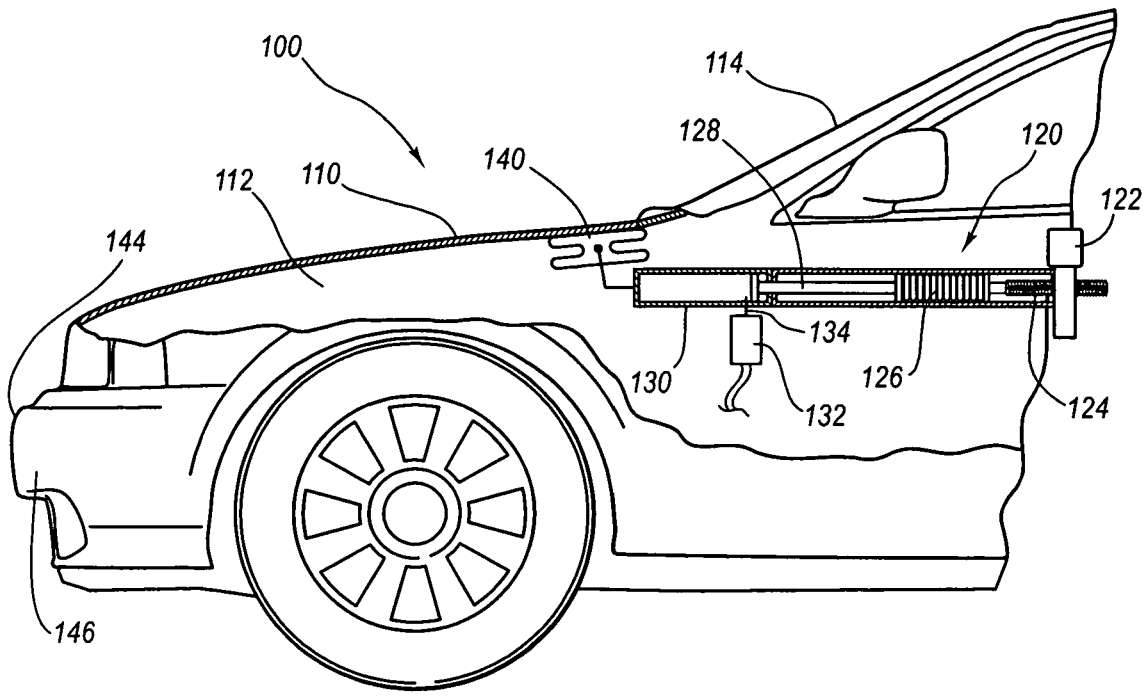
FIGS. 1A and 1B are schematic sectional side views of one embodiment of an adaptive pedestrian protection system.

It is well known that many people are injured each year due to vehicle-to-pedestrian collisions. Significant pedestrian protection can be achieved with an elevated vehicle hood to absorb energy upon impact with a pedestrian, thus reducing the chance of pedestrian contact with the underlying engine or other related parts that may cause injury upon impact. Conventional hood lifting systems are effective in reducing the injury that would otherwise be sustained by a pedestrian involved in a vehicle-to-pedestrian accident. However, such hood lifting systems can suffer from the problem of "false" or inadvertent deployments and are typically not resettable. Such deployments can be due to a vehicle colliding with an animal, a box, road debris, or other non-human object. False deployments are a substantial nuisance to the vehicle owner/operator.

The pedestrian protection systems of the invention disclosed herein are resettable and redeployable vehicle mounted hood actuation systems that alleviate the foregoing difficulties. In these hood actuation systems, an electric motor cocked spring can be loaded and unloaded based on predetermined event signals. For example, at each occurrence of a first predetermined event, such as the starting of a vehicle's engine or placing the vehicle's drive system in a drive gear, at least one electric motor with substantial gearing is energized to preload a hood lifting spring. The spring then has the stored potential energy to provide rapid hood lift in the event that a pedestrian is struck by the vehicle. Further, at each occurrence of a second predetermined event, such as the stopping of a vehicle's engine or the removing of a vehicle's drive system from a drive gear, the electric motor reverses and removes the preload from the spring without lifting the hood of the motor vehicle.

This loading and unloading function significantly increases the life of the spring by providing for a shorter loading duration life of the spring. The loading and unloading function also allows for minimizing the physical size of the spring required to lift a given hood. This feature also provides for system resettability in the event of an inadvertent deployment. Furthermore, in contrast to other spring actuated hood lifting systems, because the subject hood lifting does not store energy when the vehicle is parked, the loading and unloading function increases the safety of those persons near the vehicle hood.

In alternate embodiments, the load applied to a hood lifting actuator is made adaptive to react to additional predetermined events that will further protect a pedestrian of varying sizes, and in circumstances of a vehicle traveling at different speeds and/or accelerations. For example, a smaller person or a child in a collision with a lower speed vehicle may need a hood having a lower crush resistance or a system having a lower downwardly resistive force than would be needed for a larger person or an adult in a collision with a higher speed vehicle. Attempts to size a spring type hood actuator for a hood actuation system to be adaptive have been heretofore unsuccessful. It has been found that the preferred spring of a first predetermined resilience for a child pedestrian in a lower speed vehicle collision is not the same as a preferred spring of a second predetermined resilience for an adult pedestrian in a higher speed vehicle collision. A system is required that can adapt the resistive load of the actuator according to the size of the pedestrian and the speed of the vehicle.

Figure 1B:
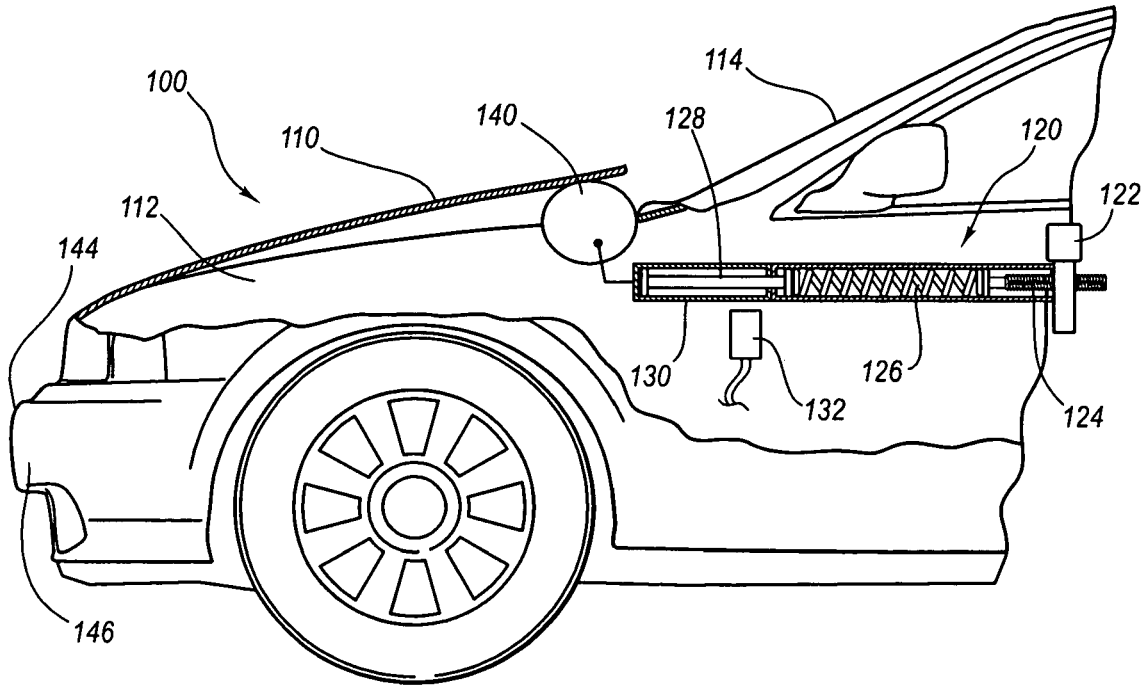

With reference to the accompanying drawing figures, FIGS. 1A and 1B are schematic views of one embodiment of an adaptive automotive pedestrian protection system of the disclosure. As shown, a motor vehicle 100 has a hood 110 covering an engine compartment 112, and a windshield 114 adjacent to hood 110. At least one hood actuation device 120 is coupled to hood 110 and provides a way of moving hood 110 between a retracted or closed position shown in FIG. 1A, and an extended position shown in FIG. 1B in which the rear portion of hood 110 is raised. The actuation device 120 is in operative communication with a control system (not shown) such that device 120 can receive signals related to predetermined events, such as the starting or stopping of the vehicle's engine, or the engagement or disengagement of the vehicle's drive system in a drive gear.

The actuation device 120 comprises an electric motor driven gearbox 122 operatively connected to a load actuation shaft 124. The electric motor driven gearbox 122 contains at least one electric motor with sufficient gearing such that the motor can be small and inexpensive. A spring 126 is connected at one end thereof to load actuation shaft 124 and at an opposite end to a piston 128, which is biased by spring 126. The load actuation shaft 124, spring 126, and piston 128 are disposed within a housing 130, which can be cylindrical in shape.

A release mechanism 132 holds piston 128 in place prior to actuation, as illustrated in FIG. 1A. The release mechanism 132 has a retractable locking pin 134 that protrudes through an opening in housing 130 to hold piston 128. At least one expandable vessel 140, such as a cloth bellows or an air bag, is in fluid communication with housing 130. Expandable vessel 140 may be positioned under hood 110 and in engine compartment 112 such that the distance of travel of hood 110 is limited by expandable vessel 140 when actuation device 120 causes hood 110 to be lifted. The expandable vessel is placed under the rear portion of hood 110 in a deflated condition as shown in FIG. 1A until deployed.

One or more sensors 144 can be located on a bumper 146 and are in operative communication with release mechanism 132 such as through a control system (not shown). The sensors 144 can detect the imminent or immediate contact of vehicle 100 with a pedestrian or other object. For example, the sensors 144 can be selected to detect physical impacts with vehicle 100, or can be pre-impact sensors utilizing, for example, radar, laser, sonar, optical, or other remote detection devices. Sensors 144 may include a forward looking infrared (FLIR) sensor for sensing the size of a pedestrian. Since actuation device 120 is resettable, simple and low cost conventional sensors can be used, such as vehicle mounted bumper switches. Alternatively, release mechanism 132 can be tied to bumper 146 with a "dumb" switch such that no sensor is required.

During operation, upon a first predetermined event signal, such as produced from a vehicle 100 engine start or the placing of vehicle 100 into a drive gear, the electric motor driven gearbox 122 causes spring 126 to be placed under a load by actuation shaft 124. The time for the motor to preload spring 126 can be about one minute. Other examples of a first predetermined event signal include the motor vehicle 100 reaching a first lower speed of travel or sensing a certain level of acceleration.

Upon a second predetermined event signal, such as from a vehicle engine stop or the placing of vehicle 100 out of a drive gear, the electric motor reverses and removes the preload from spring 126. Upon other second predetermined event signals, such as motor vehicle 100 traveling at a second higher speed, or sensing a deceleration beyond a certain threshold rate (indicating a possible impending accident), the preload of spring 126 is altered by increasing its load. One of skill in the art will appreciate other circumstances when the load of spring 126 should be decreased. A second predetermined event signal may likewise comprise a combination of the second predetermined event signals enumerated above. For instance, a second predetermined event signal may be sensed when the second higher speed is of a certain threshold while simultaneously sensing a threshold rate of deceleration.

If spring 126 is under a load when actuation device 120 receives a deployment signal from sensors 144, piston 128 is released by mechanism 132 and is driven by spring 126 to the end of housing 130, as shown in FIG. 1B. This causes pressurized gas such as air from housing 130 to fill vessel 140, which is rapidly expanded. The expansion of vessel 140 causes hood 110 to be rapidly lifted prior to a pedestrian coming into contact with hood 110 and potentially with windshield 114.

If the pedestrian's head or body comes into contact with hood 110 in the lifted position as shown in FIG. 1B, the energy of the impact is redistributed and dampened in comparison to what it would otherwise have been had hood 110 not been lifted. If the deployment of hood 110 is a "false" deployment, hood 110 will return to its predeployment position by the gas slowly (for instance within 30 seconds) leaking out of vessel 140. Upon resetting, actuation device 120 is re-armed upon receiving another first predetermined event signal. The actuation device 120 can be enabled for use at a predetermined speed range of motor vehicle 100, such as from about 5 mph to about 30 mph, which is a range in which injury to a pedestrian contacting hood 110 may be lessened.

As noted earlier, a child or smaller person may also be sensed by one of the sensors 144 immediately preceding impact. This sensor 144 may be electrically connected to electric motor drive gearbox 122, which upon receiving a signal that the pedestrian is sufficiently small to merit a reduction in upward resistive force of hood 110, reduces the preload of spring 126. One way to do this is by reversing the electric motor of gearbox 122 and thereby retracting actuation shaft 124, decompressing at least partially spring 126. In the alternative, a separate adjustable brake system (not shown) may be used, wherein the pressure on a brake is lessened to allow the spring to decompress. The freed space within housing 130 as piston 128 retracts with spring 126 allows air from vessel 140 to escape into housing 130, thereby dropping hood 110 commensurately.

Note that by compressing the gas only upon demand, the disadvantages of gas loss and performance variation associated with gas loss is avoided. Note also that by keeping the spring under load for only relatively short durations, the spring size can be minimized and spring life can be maximized.

Figure 2:
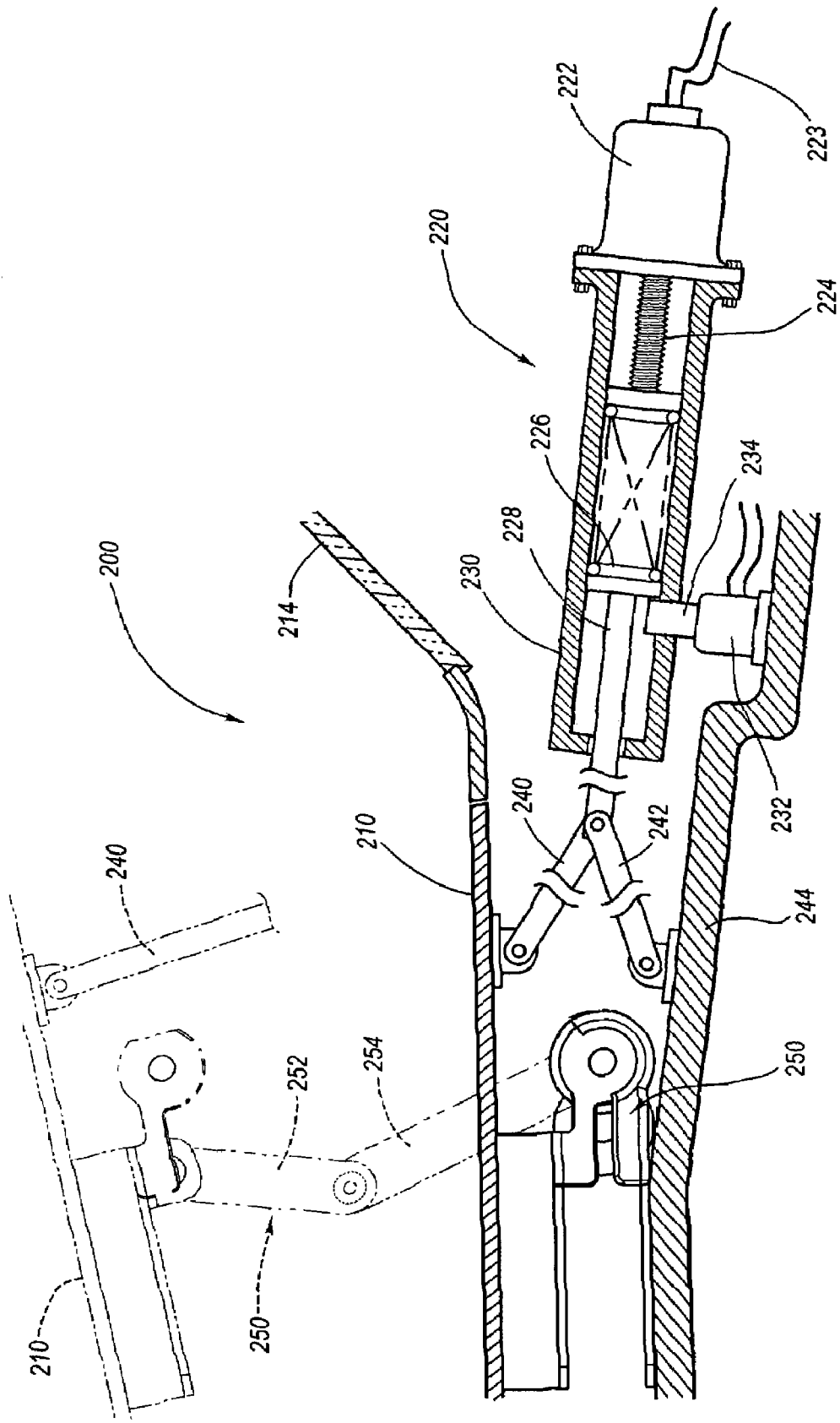
FIG. 2 is a schematic sectional side view of another embodiment of an adaptive pedestrian protection system.

FIG. 2 is a schematic view of another embodiment of an adaptive automotive pedestrian protection system of the disclosure. As depicted, a motor vehicle 200 has a hood 210 and a windshield 214 adjacent to hood 210. At least one hood actuation device 220 is coupled to hood 210 and provides a way of moving hood 210 between a retracted position and an extended position shown in phantom in FIG. 2, in which the rear portion of hood 210 is raised. The actuation device 220 is in operative communication with a control system (not shown) through an electrical connection 223 such that device 220 can receive signals related to predetermined events, such as the starting or stopping of the vehicle's engine, or the engagement or disengagement of the vehicle's drive system in a drive gear.

The actuation device 220 comprises an electric motor driven gearbox 222 operatively connected to a load actuation shaft 224. A spring 226 is connected at one end thereof to load actuation shaft 224 and at an opposite end to a piston 228 or other connecting member 228. The load actuation shaft 224, spring 226, and connecting member 228 are disposed within a housing 230, which can be cylindrical in shape.

A release mechanism 232 holds connecting member 228 in place prior to actuation, as illustrated in FIG. 2. The release mechanism 232 has a retractable locking pin 234 that protrudes through an opening in housing 230 to hold connecting member 228 in place.

At least one pedestrian detecting sensor 144, such as those discussed with reference to FIGS. 1A and 1B, can be located on a bumper of motor vehicle 200. Such sensors can be in operative communication with release mechanism 232 such as through a control system (not shown). Since actuation device 220 is resettable, simple and low cost sensors 144 (FIGS. 1A, 1B) can be used, such as conventional vehicle-mounted bumper switches. Alternatively, release mechanism 232 can be tied to the bumper (not shown) of motor vehicle 200 with a "dumb" switch such that no sensor is required.

A pair of hood lifting levers 240, 242 are movably attached to connecting member 228. The lever 240 is movably attached to hood 210, and lever 242 is movably attached to a support structure 244 of motor vehicle 200. A releasable hinge apparatus 250 is attached to hood 210 and support structure 244. Hinge apparatus 250 provides for the normal operation of lifting and closing of hood 210 for routine maintenance of motor vehicle 200.

During operation, upon a first predetermined event signal, such as a vehicle engine start or the placing of vehicle 200 into a drive gear, electric motor driven gearbox 222 causes spring 226 to be placed under a load by actuation shaft 224. Other examples of a first predetermined event signal include motor vehicle 200 reaching a first lower speed of travel or sensing a certain rate of acceleration.

Upon a second predetermined event signal, such as a vehicle engine stop or the placing of vehicle 200 out of a drive gear, the electric motor reverses and removes the preload from spring 226. Upon other second predetermined event signals, such as motor vehicle 200 traveling at a second higher speed, or sensing a deceleration beyond a certain threshold rate (indicating a possible impending accident), the preload of spring 226 is altered by increasing its load. A second predetermined event signal may likewise comprise a combination of the second predetermined event signals enumerated above.

If spring 226 is under a load when actuation device 220 receives a deployment signal, connecting member 228 is released by mechanism 232 and is driven by spring 226 to the end of housing 230. This causes hood lifting levers 240, 242 to rotate toward an extended position, thereby rapidly lifting hood 210 prior to a pedestrian coming into contact with hood 210. Hinge apparatus 250 is also released at the same time, as shown in FIG. 2 (phantom), such that a pair of movable hinge arms 252, 254 extend upwardly with hood 210.

If a pedestrian's body comes into contact with hood 210 in the lifted position, the energy of the impact is redistributed and dampened providing for potential injury reduction. Upon resetting, actuation device 220 is rearmed upon receiving another first predetermined signal. The actuation device 220 is enabled for use at a predetermined speed range of motor vehicle 200, such as from about 5 mph to about 30 mph, for instance.

As noted earlier, a child or smaller person may also be sensed by one of the sensors 144 (FIG. 1) immediately preceding impact. This sensor 144 may be electrically connected to gearbox 222, which upon receiving a signal that the pedestrian is sufficiently small to merit a reduction in downward resistive force of hood 210, reduces the preload of spring 226. One way to do this is by reversing the electric motor of gearbox 122 to retract actuation shaft 124, which at least partially decompresses spring 126. In the alternative, a separate adjustable brake system (not shown) may be used, wherein the pressure on a brake is lessened to allow the spring to decompress. The decompression of spring 126 causes connecting member 128 to retract, thereby at least partially relaxing hood lifting levers 240, 242, and commensurately dropping hood 110. The partial dropping of hood 110 before impact of a smaller person provides less downward resistance, and therefore, less chance of injury to such a pedestrian from impact with hood 110.

Figure 3A:
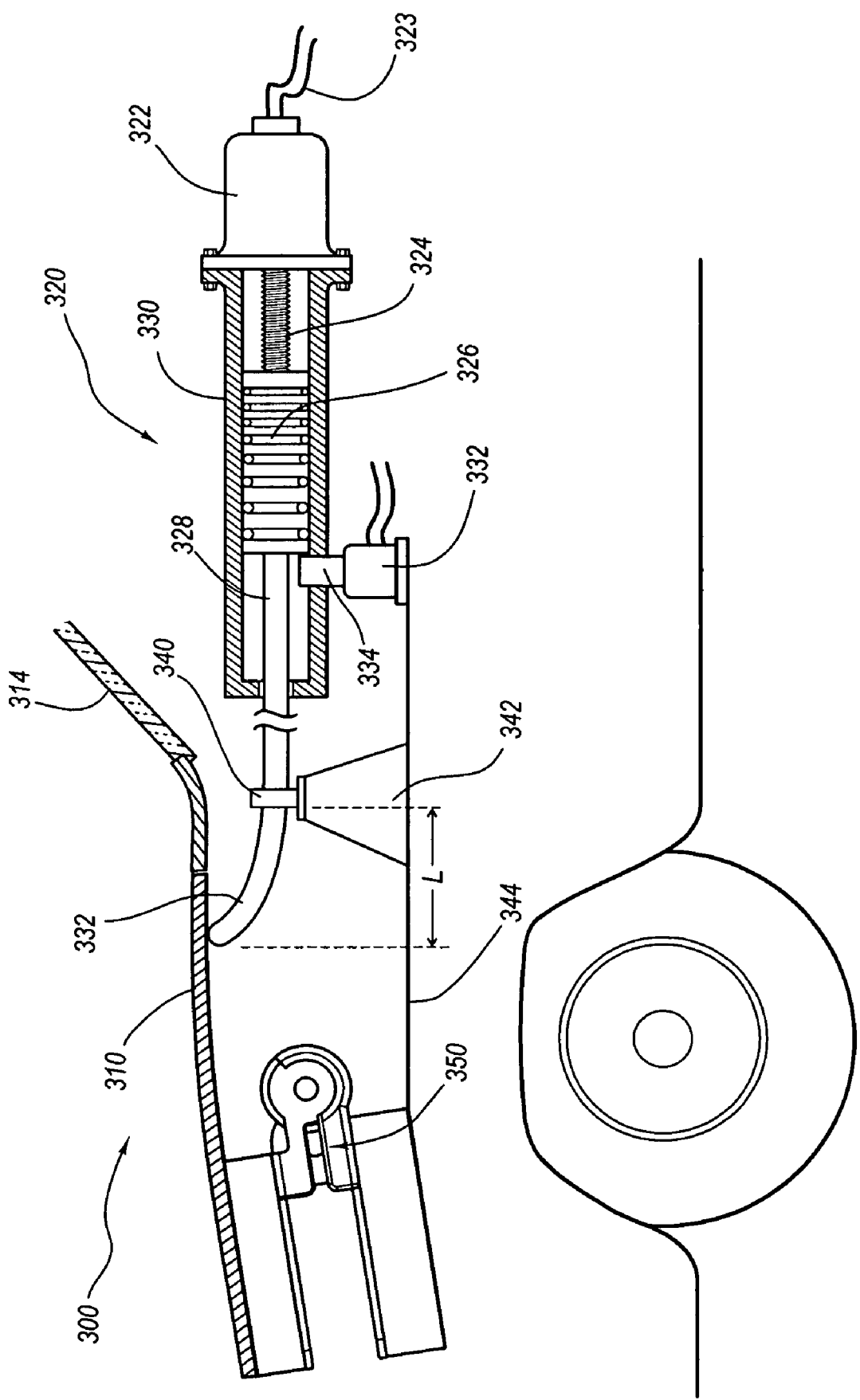
FIGS. 3A and 3B are schematic sectional side views of an adaptive pedestrian protection system positioned for a shorter cantilever length, showing deployment in FIG. 3B.
Figure 3B:
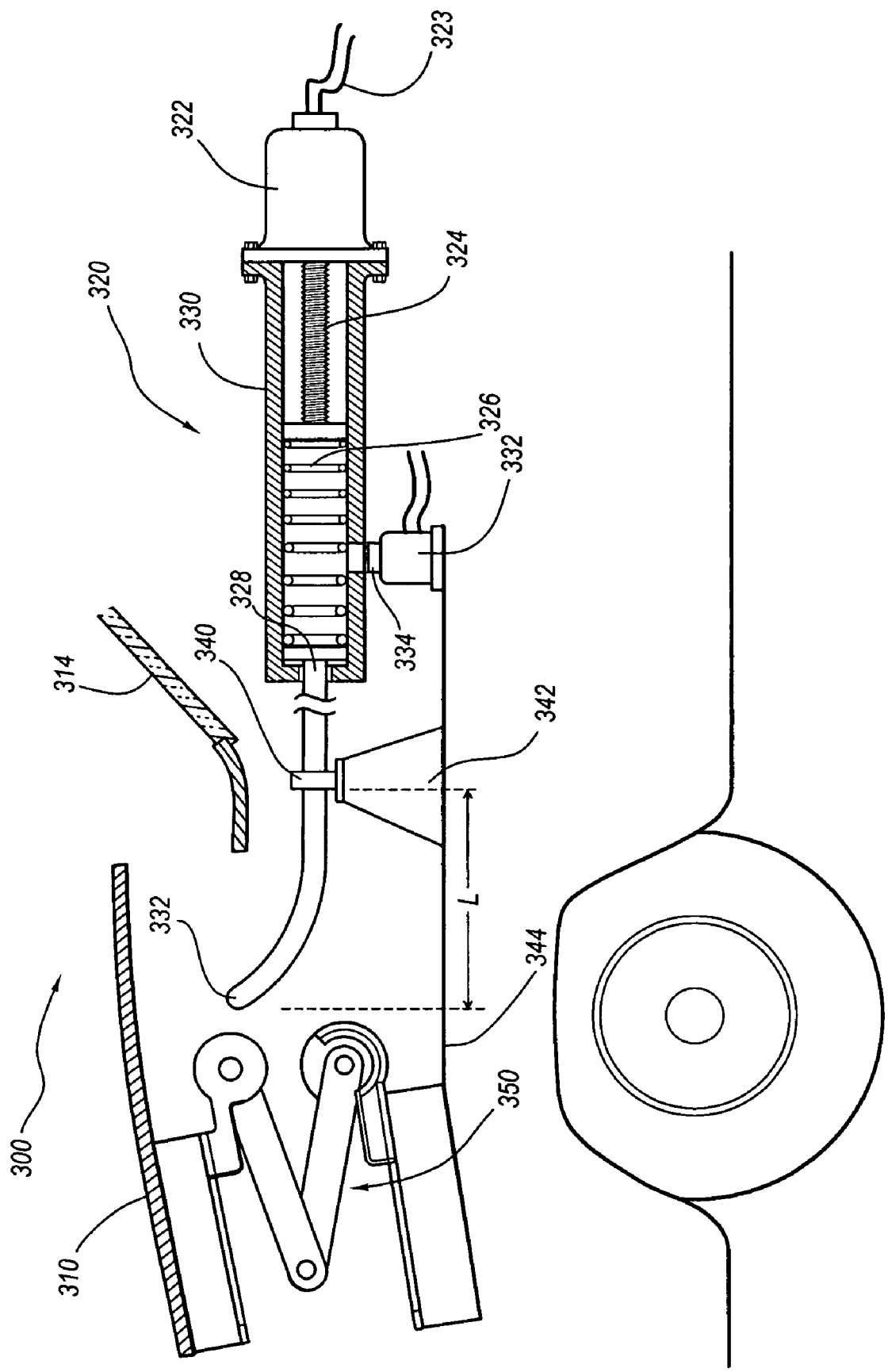

FIGS. 3A and 3B are schematic sectional side views of an adaptive pedestrian protection system positioned for a shorter cantilever length. As depicted, a motor vehicle 300 has a hood 310 and a windshield 314 adjacent to hood 310. At least one hood actuation device 320 is coupled to hood 310 and provides a way for moving hood 310 between a retracted position and an extended position as shown in FIG. 3B, in which the rear portion of hood 310 is raised. The actuation device 320 is in operative communication with a control system (not shown) through an electrical connection 323 such that actuation device 320 can receive signals related to predetermined events, such as the starting or stopping of the vehicle's engine, or the engagement or disengagement of the vehicle's drive system in a drive gear.

The actuation device 320 comprises an electric motor drive gearbox 322 operatively connected to a load actuation shaft 324. A coil spring 326 is connected at one end thereof to load actuation shaft 324 and at an opposite end to a leaf spring 328. The load actuation shaft 324, coil spring 326, and the proximal end of leaf spring 328 are disposed within a housing 330, which can be cylindrical in shape or rectangular such as to accommodate the shape of leaf spring 328. Coil spring 326 may be manufactured so that at a first end, the coils of coil spring 326 have a larger cross-sectional area than at a second end of coil spring 326, thereby causing a rate of resistance to compression of coil spring 326 to change at a greater rate when the coil spring is subject to an increasingly larger load. That is, a single coil spring 326 functions over a wider range of load resistive values. Adaptively applying larger loads may be advantageously applied as will be discussed shortly.

A release mechanism 332 holds leaf spring 328 in place prior to actuation, as illustrated in FIG. 3B. The release mechanism 332 has a retractable locking pin 334 that protrudes through an opening in housing 330 to hold leaf spring 328 in place.

At least one pedestrian detecting sensor 144, such as discussed with reference to FIGS. 1A and 1B, can be located on a bumper of motor vehicle 300. Sensor 144 may be in operative communication with release mechanism 332 such as through a control system (not shown). As before, actuation device 320 is resettable. Alternatively, release mechanism 332 can be tied to the bumper of motor vehicle 300 with a "dumb" switch such that no sensor is required.

Leaf spring 328 may have a rectangular cross-section and project from the inside of housing 330 to the outside of housing 330 to come into contact with hood 310. A cantilevered distal end 332 of leaf spring 328 near hood 310 may angle or curve upwards, and when coil spring 326 is loaded, it may be biased against hood 310. To effect such biasing, leaf spring 328 is movably coupled to coil spring 326 within housing 330. Leaf spring 328 extends through housing 330 and passes through a retaining ring 340 (or other guiding member) attached to the top of a fulcrum 342 base. The length L of leaf spring 328 that projects beyond retaining ring 340 defines the cantilevered end 332 of leaf spring 328. Fulcrum 342 is attached to a support structure 344 of motor vehicle 300. Additionally, a releasable hinge apparatus 350 provides for the normal operation of lifting and closing of hood 310, as discussed before. Operation and deployment of hinge devices such as apparatus 350, to include their resettability, are taught in U.S. patent application Ser. No. 11/407,481 to Brent Parks, an application assigned to the assignee of this application, which is herein incorporated by reference.

The length L of cantilevered end 332 of leaf spring 328 may be variably adjusted to vary the load reaction ability of the leaf spring 328 to a pedestrian coming into contact with motor vehicle 300. That is, the location of fulcrum 342 and the length L of cantilevered end 332 of leaf spring 328 may be adjusted to vary the upward static or lifting load, and thereby the downward resistive force placed on hood 310. For instance, a longer length L will result in a lesser effective resistance to impact on hood 310, while a shorter length L will result in a greater effective resistance to impact on hood 310. Generally, a "longer" cantilevered end 332 may be designated as, when coil spring 326 is loaded, a length L that is longer than the remainder of leaf spring 328, e.g., the portion that extends from fulcrum 342 back to coil spring 326, as shown in FIG. 3B. Likewise, a "shorter" cantilevered end 343 may be generally designated as, when coil spring 326 is loaded, a length L that is shorter than the remainder of leaf spring 328, as shown in FIG. 3A.

During operation, upon a first predetermined event signal, such as a vehicle engine start or the placing of the vehicle into a drive gear, electric motor driven gearbox 322 causes coil spring 326 to be placed under a load by actuation shaft 324. Other examples of a first predetermined event signal include motor vehicle 300 reaching a first lower speed of travel or sensing a certain rate of acceleration.

Upon a second predetermined event signal, such as a vehicle engine stop or the placing of vehicle 300 out of a drive gear, the electric motor of gearbox 322 reverses and removes the preload from coil spring 326. Upon other second predetermined event signals, such as motor vehicle 300 traveling at a second higher speed, or sensing a deceleration beyond a certain threshold rate (indicating a possible impending accident), the preload of coil spring 326 is altered by increasing its load. This later alteration of the load of coil spring 326 adaptively prepares for what could be a larger impact with a pedestrian should it occur while traveling at a faster speed, or while quickly decelerating. The increase in load of coil spring 326 may be achieved through the electric motor of gearbox 322 increasing the load on coil spring 326 via actuation shaft 324. One of skill in the art will recognize other possible first and second predetermined event signals. For instance, a second predetermined event signal may comprise a combination of the second predetermined event signals enumerated above.

If a pedestrian's body comes into contact with hood 310 in the lifted position, the energy of the impact is redistributed and dampened providing for potential injury reduction. Upon resetting, actuation device 320 is re-armed upon receiving another first predetermined signal. The actuation device 320 is enabled for use at a predetermined range of speed for motor vehicle 300, such as from about 5 mph to about 30 mph, for instance, which is a range in which injury to a pedestrian contacting hood 310 may be lessened.

As noted earlier, a child or smaller person may also be sensed by one of the sensors 144 (FIG. 1) immediately preceding impact. This sensor 144 may be electrically connected to gearbox 322, which upon receiving a signal that the pedestrian is sufficiently small to merit a reduction in downward resistive force of hood 310, reduces the preload of coil spring 326. One way to do this is by reversing the electric motor of gearbox 322 to retract actuation shaft 324, which at least partially decompresses spring 326. In the alternative, a separate adjustable brake system (not shown) may be used, wherein the pressure on a brake is lessened to allow the spring to decompress. The decompression of coil spring 326 causes leaf spring 328 to retract, thereby at least partially retracting the cantilevered end 332 of leaf spring 328, and thus partially dropping hood 310 before the pedestrian impacts hood 310. The partial dropping of hood 310 before impact of a smaller person provides lesser upwards resistance, and therefore, less chance of injury to such a pedestrian.

Figure 4A:
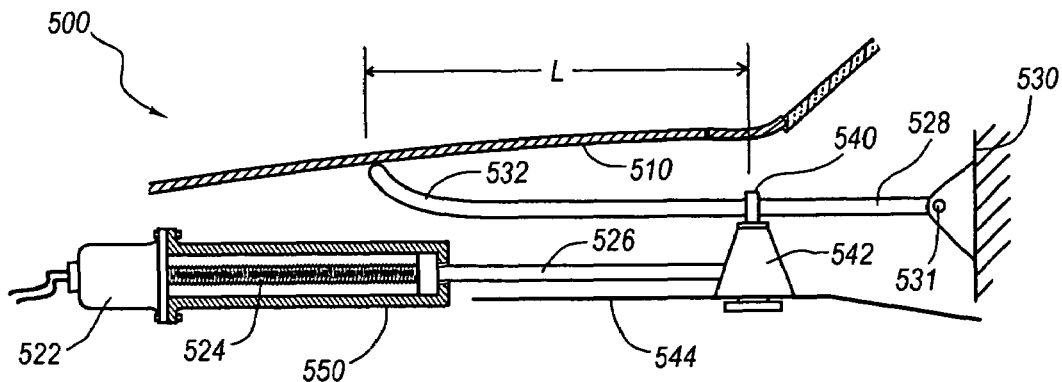
FIGS. 4A and 4B are schematic sectional side views of an alternate embodiment of an adaptive pedestrian protection system showing respectively, long and short cantilever pre-deployment positions.
Figure 4B:
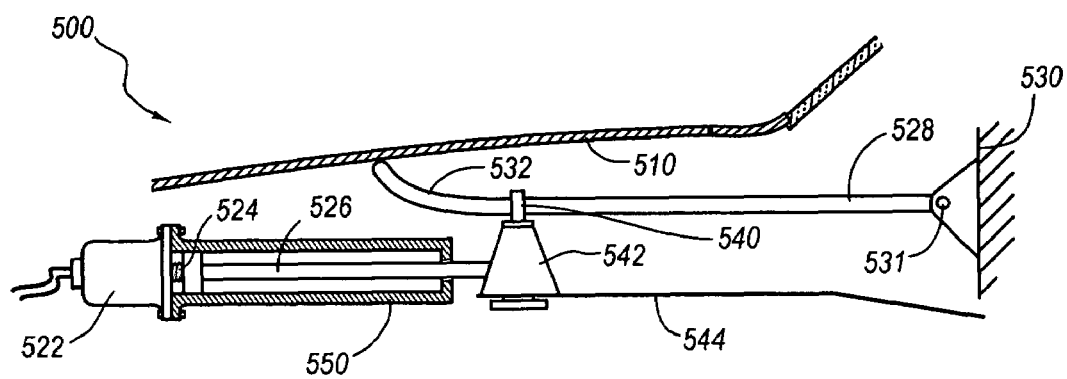

FIGS. 4A and 4B are schematic sectional side views of an alternate embodiment of an adaptive pedestrian protection system for a motor vehicle 500, showing respectively long and short cantilever pre-deployment positions. In this embodiment, no hood release device is shown with the adaptive load system for applying a variably changing static force to a hood 510. An electric drive motor gearbox 522 is operatively connected to a load actuation shaft 524, which is in turn connected to a connecting member 526. A leaf spring 528 may be pivotally attached at a proximal end to a support structure 530 of motor vehicle 500 with a hinged connection 531. Alternately, leaf spring 528 may be fixedly attached to support structure 530. Leaf spring 528 includes a cantilevered distal end 532 of length L, and passes through a retaining ring 540 that is connected to the top of a fulcrum 542.

Cantilevered end 532 is defined by that portion of leaf spring 528 extending beyond retaining ring 540, and may include an angled portion that contacts hood 510. Fulcrum 542 may be slid along a track 544 formed in motor vehicle 500 generally parallel to connecting member 526. Load actuation shaft 524 may be slidably confined within a housing 550, in which also the connection of shaft 524 and connecting member 526 may be made. Piston 526 is connected to fulcrum 542 such that, when an electric motor of gearbox 526 drives load actuation shaft 524, fulcrum 542 moves accordingly along track 144, thereby adjusting the effective length L of cantilevered end 532.

Changing length L, as discussed previously, will vary the upward hood actuation force and the downward resistive force placed on hood 510. The gradual increase in static force as fulcrum 542 moves toward housing 550 may occur due to a downward slope of hood 510 coming into contact with cantilevered end 532. Alternately, to the extent that a static load is placed on hood 510 by spring 532 when fulcrum 542 is in a position as shown in FIG. 4A, an increased static load is applied as fulcrum 542 is moved to a position as shown in FIG. 4B. The increase in static load is commensurate with the amount of movement of fulcrum 542 along track 544. Specifically, the longer length L of FIG. 4A will provide a lesser resistive load on hood 510 than the shorter length L of FIG. 4B.

A sensor 144 (FIG. 1) may be located on a bumper (not shown) of motor vehicle 500 that is electrically connected to gearbox 522. This sensor 144 may be a forward looking infrared (FLIR) sensor, or other sensor that may detect the size or mass of a pedestrian. Upon sensing that a pedestrian is a child or a smaller person, and before the pedestrian impacts hood 510, gearbox 522 may automatically adjust the fulcrum 542 position to increase length L, and thereby lessen the resistive load placed on hood 510.

Likewise, other sensors (not shown) may be used to detect the speed and/or deceleration of motor vehicle 500. During operation, upon a first predetermined event signal, such as a vehicle engine start or the placing of the vehicle into a drive gear, electric motor driven gearbox 522 causes fulcrum 542 to be moved along track 544 (best seen in FIG. 6) to an initial position, which places a preload on leaf spring 528 as biased against hood 510. Such an initial position may be as shown in FIG. 4A. Other examples of a first predetermined event signal include motor vehicle 300 reaching a first lower speed of travel or sensing a certain rate of acceleration.

Upon a second predetermined event signal, such as a vehicle engine stop or the placing of vehicle 500 out of a drive gear, the electric motor of gearbox 522 reverses and removes the preload from leaf spring 528. Upon other second predetermined event signals, such as motor vehicle 500 traveling at a second higher speed, or sensing a deceleration beyond a certain threshold rate (indicating a possible impending accident), the preload of leaf spring 528 is altered by increasing its load. As displayed, increasing the load of leaf spring 528 occurs by pulling fulcrum 542 closer to housing 550. This later alteration of the load of leaf spring 528 adaptively prepares for what could be a quicker, more forceful impact with a pedestrian should it occur while traveling at a faster speed, or while quickly decelerating. One of skill in the art will recognize other possible first and second predetermined event signals.

Figure 5A:
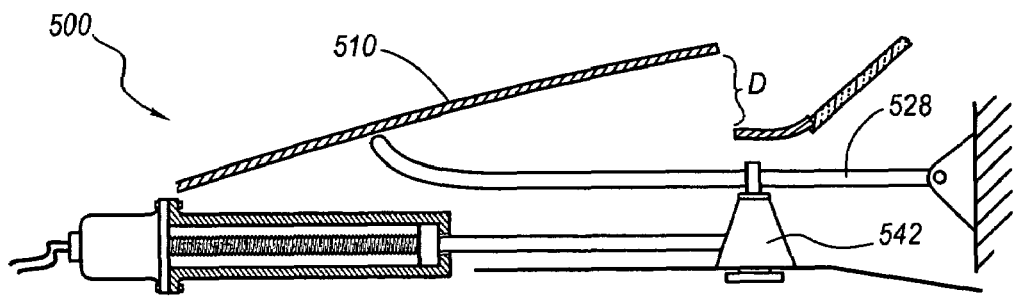
FIGS. 5A and 5B are sectional side views of the alternate embodiments as shown in FIGS. 4A and 4B, respectively, wherein a hood of a motor vehicle is deployed.
Figure 5B:
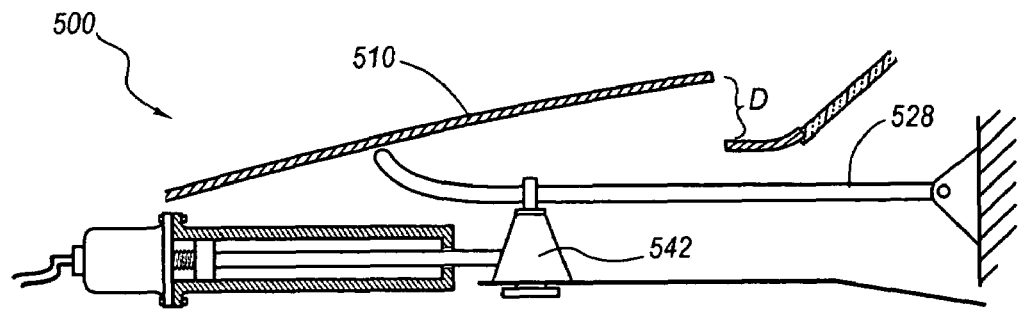

FIGS. 5A and 5B are sectional side views of the embodiment as shown in FIGS. 4A and 4B, respectively, wherein a hood of a motor vehicle is deployed. That is, the lesser preload on leaf spring 528 in FIG. 4A causes hood 510 to deploy as shown in FIG. 5A upon impact of a pedestrian. Likewise, the greater preload on leaf spring 528 in FIG. 5A causes hood 510 to deploy as shown in FIG. 5B.

As mentioned, a release device is not shown because any such device as known to those of skill in the art may be employed so long as pedestrian impact may be sensed by sensors (144 in FIG. 1) operatively connected to such an actuation device. For example, actuation device may include a hinged pair of levers (such as 240, 242 of FIG. 2) that work in concert with a hood latch release (not shown), which is triggered upon impact, thereby allowing the preload of leaf spring 528 to force hood 510 to an extended position. The levers limit the distance D that hood 500 deploys open. Notable in FIGS. 5A and 5B is that so long as a threshold initial preload is placed on leaf spring 528 (such as in FIG. 5A), hood 510 may be deployed open regardless of how fulcrum 542 has been moved to adjust the preload. Also, the nature of using leaf spring 528 allows hood 510 to be easily reset after deployment.

Figure 6:
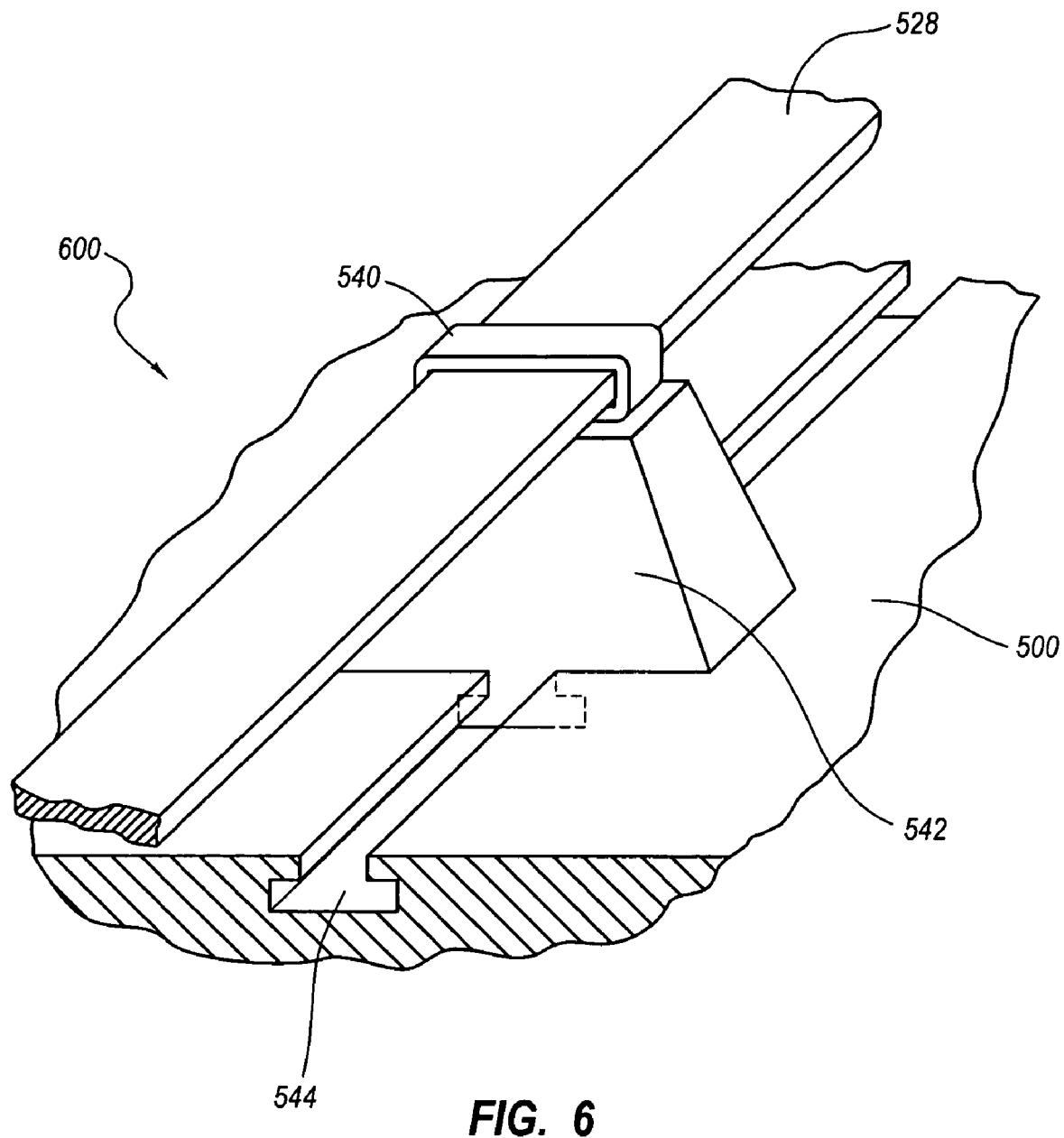
FIG. 6 is an isometric view of an adaptive facilitator mechanism that allows adjustment of a static load force as applied to a hood as displayed in FIGS. 4A, 4B, 5A, and 5B.

FIG. 6 is an isometric view of an adaptive facilitator mechanism 600 that allows adjustment of a biasing static load force as applied to hood 510, as displayed in FIGS. 4A, 4B, 5A, and 5B. Leaf spring 528, which is rectangular in shape, is shown being fed through the retaining ring 540, which is attached to the top of the fulcrum 542. The fulcrum track 544 defined within motor vehicle 500 facilitates movement of fulcrum 542 along the direction longitudinal with the track 544, thereby adjusting the biasing static load force as discussed above.

Any motor can be used to extend a load actuation shaft such as those identified at 124, 224, 324, 524, and thereby adjust the load placed upon a spring such as those identified at 126, 226, 326, 528. For instance, the motor may contain proper gear ratios to obtain the required varied levels of actuation load placed against a hood. Motors such as electric motor driven gearboxes 122, 222, 322, 522 are all examples of suitable motors. The motors disclosed herein are examples of means for variably adjusting an actuation load. The springs identified at 126, 226, 326, 328, and 528 are all examples of means for retaining a variable potential energy obtained from the variable actuation load. The release mechanisms identified at 120, 220, 320 in combination with at least one sensor such as sensor 144 are all means for releasing the potential energy upon sensing an impact with a pedestrian. Various hood lifting devices may be used that work in concert with the release mechanisms 120, 220, 320 to execute the actual lifting of hood 110, 210, 310, 510. For instance, expandable vessel 140, hood lifting levers 240, 242, and leaf spring 328, 528 are all examples of means for translating the potential energy released to a hood actuation force to lift a hood of a motor vehicle and thereby lessen the impact of the pedestrian.

In one embodiment, a FLIR sensor, or other adequate sensor know in the art, are examples of means for sensing the size of the pedestrian. A motor such as an electric motor driven gearbox 122, 222, 322, or 522 being operatively connected to, respectively, a spring such as spring 126, 226, 326, 328, or 528 are all examples of means for reducing a hood load before the pedestrian impacts a hood upon determining that the pedestrian is of sufficiently small size.

A motor such as an electric motor driven gearbox 122, 222, 322, or 522 electrically connected to at least one sensor (not shown), such as a sensor affiliated with a vehicle's speedometer, is an example of means for sensing a speed of travel or a rate of deceleration of a motor vehicle that pass threshold rates. Such a sensor additionally is an example of means for variably adjusting the actuation load in communicating to the electric motor of gearbox when an adjustment is necessary to be prepared to deploy a hood to protect a pedestrian in an accident or at a moment that harm to a pedestrian may be lessened if such an accident were to occur.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. § 112 ¶6.

The invention claimed is:

1. An automotive pedestrian protection hood lifting system, comprising:
    a load actuation shaft;
    a spring connected at a first end thereof to the load actuation shaft;
    a connecting member connected to a second opposite end of the spring and biased by the spring, wherein upon a first predetermined event signal, the spring is loaded, and upon a second predetermined event signal, the spring load is altered, and wherein a housing surrounds the spring and at least a portion of the connecting member;
    an expandable vessel in fluid communication with the housing;
    a gas surrounding the connecting member within the housing; and
    a release mechanism that holds the connecting member in place prior to actuation, wherein when the connecting member is released, the loaded spring slides the connecting member in the housing and the gas is forced into the expandable vessel, causing a hood of a motor vehicle to be lifted, and
    wherein the expandable vessel comprises one of a cloth bellows and an air bag.

2. An automotive pedestrian protection hood lifting system, comprising:
    a load actuation shaft;
    a spring connected at a first end thereof to the load actuation shaft;
    a connecting member connected to a second opposite end of the spring and biased by the spring, wherein upon a first predetermined event signal, the spring is loaded, and upon a second predetermined event signal, the spring load is altered, and wherein a housing surrounds the spring and at least a portion of the connecting member;
    an expandable vessel in fluid communication with the housing;
    a gas surrounding the connecting member within the housing;
    a release mechanism that holds the connecting member in place prior to actuation, wherein when the connecting member is released, the loaded spring slides the connecting member in the housing and the gas is forced into the expandable vessel, causing a hood of a motor vehicle to be lifted;
    an electric motor operatively connected to the load actuation shaft; and
    a sensor on a bumper of the vehicle electrically connected to the electric motor to sense that a pedestrian is a sufficiently small person before the electric motor reduces the load on the spring, via the actuation shaft, to at least partially deflate the expandable vessel, thereby reducing a downward resistance of the hood.

3. An automotive pedestrian protection hood lifting system, comprising:
- a load actuation shaft;
- a spring connected at a first end thereof to the load actuation shaft;
- a connecting member connected to a second opposite end of the spring and biased by the spring, wherein upon a first predetermined event signal, the spring is loaded, and upon a second predetermined event signal, the spring load is altered, wherein a housing surrounds the spring and at least a portion of the connecting member, and
- wherein the first predetermined event signal is produced from at least one of starting an engine of the motor vehicle and placing the motor vehicle into a drive gear.

4. An automotive pedestrian protection hood lifting system, comprising:
- a load actuation shaft;
- a spring connected at a first end thereof to the load actuation shaft;
- a connecting member connected to a second opposite end of the spring and biased by the spring, wherein upon a first predetermined event signal, the spring is loaded, and upon a second predetermined event signal, the spring load is altered, wherein a housing surrounds the spring and at least a portion of the connecting member, and
- wherein the second predetermined event signal is produced from at least one of stopping an engine of the motor vehicle and placing the motor vehicle out of a drive gear, upon which the spring is unloaded.

5. An automotive pedestrian protection hood lifting system, comprising:
- a load actuation shaft;
- a spring connected at a first end thereof to the load actuation shaft;
- a connecting member connected to a second opposite end of the spring and biased by the spring, wherein upon a first predetermined event signal, the spring is loaded, and upon a second predetermined event signal, the spring load is altered, wherein a housing surrounds the spring and at least a portion of the connecting member, and
- wherein the first predetermined event signal is produced from a first lower speed of the motor vehicle, and the spring load comprises a first load.

6. The system of claim 5, wherein the second predetermined event signal is produced from at least one of sensing the motor vehicle pass a threshold speed, a deceleration of the motor vehicle beyond a threshold rate, and a combination thereof, and wherein the altered spring load comprises a second load greater than the first load.

7. A pedestrian protection apparatus, comprising:
- an actuation device coupled to a hood and operatively connected to a motor vehicle to move the hood between a retracted position and an extended position,
- wherein the actuation device selectively varies a load placed upon the hood; and
- wherein the actuation device applies a first load to the hood upon a first predetermined event signal comprising at least one of turning on an engine of the motor vehicle, placing the motor vehicle in a drive gear, and a first lower speed.

8. The apparatus of claim 7, wherein the load is selectively varied in response to a second predetermined event signal comprising at least one of turning off the engine, placing the motor vehicle out of the drive gear, a second greater speed, a rate of deceleration beyond a threshold rate, and a combination thereof.

9. The apparatus of claim 8, wherein the actuation device applies the hood load through a coil spring having a non-constant cross-sectional area.

10. A pedestrian protection apparatus, comprising:
- an actuation device coupled to a hood and operatively connected to a motor vehicle to move the hood between a retracted position and an extended position,
- wherein the actuation device applies a first load to move the hood to the extended position upon sensing the presence of a pedestrian; and
- wherein the actuation device reduces the load applied to the hood to a second load that is smaller than the first load upon sensing information about the pedestrian to reduce the upward resistive force of the hood.

11. An automotive hood lifting system to lift a hood of a motor vehicle to protect a pedestrian, comprising:
- a load actuation shaft;
- a spring connected at a first end thereof to the load actuation shaft, wherein the spring is loaded upon a first predetermined event signal, and upon a second predetermined event signal the spring load is altered;
- a hood lifting device connected to a second opposite end of the spring and biased by the spring, wherein a distal end of the hood lifting device is configured to contact the hood;
- a housing containing the preloaded spring; and
- a release mechanism that holds the hood lifting device in place prior to actuation;
- wherein when the hood lifting device is released, the preloaded spring slides the hood lifting device in the housing, causing the distal end of the hood lifting device to forcibly lift the hood.

12. The system of claim 11, wherein the distal end of the hood lifting device comprises a pair of lifting levers movably attached thereto, wherein upon release of the hood lifting device, the lifting levers expand to an extended position.

13. The system of claim 11, wherein the spring is a coil spring comprising a different cross-sectional area at the first end than at the second end thereof.

14. The system of claim 11, wherein the hood lifting device comprises a leaf spring, the system further comprising:
- a fulcrum slidably coupled to the leaf spring, wherein the portion of the leaf spring extending past a position of the fulcrum defines a cantilevered end of calculated length.

15. The system of claim 14, wherein the distal end of the leaf spring comprises an upwardly angled portion that contacts the hood.

16. The system of claim 14, wherein the position of the fulcrum is adjustable along the length of the leaf spring to adjust the length of the cantilevered end, to vary the load reaction ability of the leaf spring to a pedestrian coming into contact with the motor vehicle.

17. The system of claim 11, further comprising one or more sensors located on a bumper of the motor vehicle, wherein at least one sensor is in operative communication with the release mechanism.

18. The system of claim 17, wherein after the hood has lifted, and within a time period before the pedestrian impacts the hood, the spring load is at least partially reduced, thereby reducing the load applied to the hood by the hood lifting device.

19. The system of claim 18, further comprising:
- an electric motor operatively connected to the load actuation shaft.

20. The system of claim 19, wherein at least one sensor is electrically connected to the electric motor to sense that the pedestrian is a sufficiently small person before the electric motor reduces the preload on the spring through the actuation shaft.

21. The system of claim 11, wherein the first predetermined event signal is produced from at least one of starting an engine of the motor vehicle and placing the motor vehicle into a drive gear.

22. The system of claim 21, wherein the spring is unloaded upon the second predetermined event signal produced from at least one of stopping an engine of the motor vehicle and placing the motor vehicle out of a drive gear.

23. The system of claim 11, wherein the first predetermined event signal is produced from a first lower speed of the motor vehicle, and the spring load comprises a first load.

24. The system of claim 23, wherein the second predetermined event signal is produced from at least one of sensing the motor vehicle pass a threshold speed and a deceleration of the motor vehicle beyond a threshold rate, and wherein the altered spring load comprises a second load greater than the first load.

25. An automotive hood lifting system to lift a hood of a motor vehicle to protect a pedestrian, comprising:
a leaf spring pivotally attached to a body of the motor vehicle and biased against the hood; and
a fulcrum slidably along a track and slidably coupled to the leaf spring, wherein the portion of the leaf spring extending past a position of the fulcrum defines a cantilevered end of calculated length;
wherein upon a first predetermined event signal, the fulcrum is positioned along the track to place the leaf spring under a first load against the hood, and upon a second predetermined event signal, the fulcrum is moved along the track to alter the load of the leaf spring against the hood; and
wherein the first predetermined event signal is produced from at least one of starting an engine of the motor vehicle, placing the motor vehicle into a drive gear, and passing a first speed.

26. The system of claim 25, further comprising:
an electric motor;
a load actuation shaft operatively connected to the electric motor; and
a connecting member connected to the load actuation shaft.

27. The system of claim 26, further comprising a sensor located on a bumper of the motor vehicle and in electrical communication with the electric motor to sense information about the pedestrian before the electric motor, via the load actuation shaft and connecting member, alters the position of the fulcrum to reduce the load of the leaf spring against the hood.

28. The system of claim 25, wherein upon the first predetermined signal, the fulcrum is positioned at a first position, which is adjustable to vary an initial length of the cantilevered end based on a desired first load.

29. The system of claim 28, wherein upon the second predetermined signal the fulcrum is moved along the track to one of shorten the cantilevered end to increase the hood load and lengthen the cantilevered end to decrease the hood load.

30. The system of claim 25, wherein the leaf spring is unloaded upon the second predetermined event signal produced from at least one of stopping an engine of the motor vehicle and placing the motor vehicle out of a drive gear.

31. The system of claim 25, wherein the second predetermined event signal is produced from a second speed of the motor vehicle that is greater than the first speed of the motor vehicle, and the altered spring load comprises a second load greater than the first load.

32. The system of claim 25, wherein the second predetermined event signal is produced from sensing a deceleration of the motor vehicle beyond a threshold rate, and the altered spring load comprises a second load greater than the first load.

33. The system of claim 25, further comprising:
a sensor located on a bumper of the motor vehicle to sense the presence of a pedestrian; and
a release mechanism movably connected to the hood and in operative communication with the sensor, to control the release of the hood upon impact of the pedestrian.

34. An automotive pedestrian protection hood lifting system, comprising:
means for variably adjusting an actuation load;
means for retaining a variable potential energy obtained from the variable actuation load;
means for releasing the potential energy upon sensing an impact with a pedestrian; and
means for translating the potential energy released to a hood actuation force to lift a hood of a motor vehicle and thereby lessen the impact of the pedestrian;
wherein the means for variably adjusting the actuation load further comprises means for sensing a deceleration rate of the motor vehicle, wherein the actuation load is increased upon sensing that the deceleration passes a threshold rate.

* * * * *

UNITED STATES PATENT AND TRADEMARK OFFICE
CERTIFICATE OF CORRECTION

PATENT NO.         : 7,413,049 B2
APPLICATION NO. : 11/582655
DATED                : August 19, 2008
INVENTOR(S)      : Michael R. Schramm et al.

It is certified that error appears in the above-identified patent and that said Letters Patent is hereby corrected as shown below:

On the title page, in the Assignee item [73], please delete "Antolin" and replace with -- "Autoliv".

Signed and Sealed this

Thirtieth Day of December, 2008

JON W. DUDAS
*Director of the United States Patent and Trademark Office*